UNITED STATES PATENT OFFICE.

JACOB MOSER AND ALBERT F. MOSER, OF SIGEL, ILLINOIS.

ADJUSTABLE LANTERN-HOLDER.

SPECIFICATION forming part of Letters Patent No. 373,472, dated November 22, 1887.

Application filed June 17, 1887. Serial No. 241,684. (No model.)

*To all whom it may concern:*

Be it known that we, JACOB MOSER and ALBERT F. MOSER, citizens of the United States, residing at Sigel, in the county of Shelby and State of Illinois, have invented a new and useful Adjustable Lantern-Holder, of which the following is a specification, reference being had to the figure, which is a perspective view of our device.

The hangers A A are bent at their upper ends in such a manner as to form a hook, $b$, which is provided with a set-screw, $f$. The lower ends of said hangers are oppositely bent to form the base upon which the lantern rests.

The cross-piece $d$ is furnished with a strap, $e$, which may be securely buckled around the foot of a lantern. To the cross-piece $h$ is secured a spring-wire, $j$, forming a half-circle for keeping the lantern in an upright position.

The lantern-holder is adjustable on the dashboard (front side) of any wagon or buggy, and can be retained after adjustment by the set-screws $f f$.

What we desire to claim and secure by Letters Patent is—

The herein-described lantern-holder, consisting of the two hangers A A, bent at their upper ends to form hooks and provided with set-screws, and oppositely bent at their lower ends to form rests, and the two horizontal cross pieces $d$ and $h$, provided, respectively, with a strap and a wire, the latter being semicircular in form, substantially as set forth.

JACOB MOSER.
ALBERT F. MOSER.

Witnesses:
J. E. HUGO HEMMAN,
EMIL F. HOFFMANN.